United States Patent [19]

Dietz et al.

[11] Patent Number: 5,074,919
[45] Date of Patent: Dec. 24, 1991

[54] PREPARATION OF VAT DYES AND PIGMENTS OF THE PERINONE SERIES

[75] Inventors: Erwin Dietz, Kelkheim; Gustav Kapaun; Siegfried Schiessler, both of Bad Soden am Taunus, all of Fed. Rep. of Germany

[73] Assignee: Hoechst Aktiengesellschaft, Frankfurt am Main, Fed. Rep. of Germany

[21] Appl. No.: 427,456

[22] Filed: Oct. 26, 1989

[30] Foreign Application Priority Data

Oct. 28, 1988 [DE] Fed. Rep. of Germany ....... 3836674

[51] Int. Cl.$^5$ ..................... C09B 57/12; C07D 471/00
[52] U.S. Cl. ................................. 106/494; 106/493; 106/498; 546/32; 548/337; 548/346
[58] Field of Search ............ 106/498, 493, 494, 287.2, 106/287.21, 287.25, 287.27; 548/337, 346; 546/32

[56] References Cited

U.S. PATENT DOCUMENTS 3,772,303 11/1973 Spietschka et al. ................. 106/498
3,865,829 2/1975 Wagner ................................ 546/32

FOREIGN PATENT DOCUMENTS 430632 6/1926 Fed. Rep. of Germany .
1271861 2/1969 Fed. Rep. of Germany .
1569740 5/1970 Fed. Rep. of Germany .
1569736 2/1971 Fed. Rep. of Germany .
3235572 3/1984 Fed. Rep. of Germany .
182823 8/1966 U.S.S.R. .
1027134 4/1966 United Kingdom .

OTHER PUBLICATIONS

Fiat Final Report 1313 II, p. 168.
Khoroshom, V. L. Chem. Abs. 66:1983 5K (1967).
Herzog, H. Chem. Abs. 41:101:8713j (1984).
Rusanov et al., Chim. Geterotsikl. Soedinenii 7: pp. 968–971, (1979) (translation, pp. 791–794).

Primary Examiner—William R. Dixon, Jr.
Assistant Examiner—Anthony J. Green

[57] ABSTRACT

The conventional condensation of naphthalene-1,4,5,8-tetracarboxylic acid with 1,2-diaminobenzene gives the resulting naphthoylenebisbenzimidazole isomers together in the cis and trans form. It is desirable to shift the isomer ratio of the mixture obtained toward the desirable trans product and to reduce the amount of cis product obtained. It is also desirable to develop a process of preparation which optimizes the yield and improves the waste water situation.

This object is achieved according to the invention by subjecting virtually stoichiometric amounts of the starting compounds to a precondensation at 60° to 110° C. in an aqueous medium and then completing the condensation in the aqueous medium in a second stage at 130° to 180° C.

11 Claims, No Drawings

PREPARATION OF VAT DYES AND PIGMENTS OF THE PERINONE SERIES

DESCRIPTION

The polycyclic colorants of the perinone series are, in chemical terms, products derived inter alia from naphthalene-1,4,5,8-tetracarboxylic acid as parent structure. Commercial representatives of this class are on the market in different forms: as vat dyes for the dyeing of textiles, but also, owing to their physical properties, as pigments, although for the latter use they must be first specially prepared from the crude products of the condensation process by means of chemical and/or physical aftertreatment operations (conditioning or finishing).

The perinone ring system is formed by reaction of naphthalene-1,4,5,8-tetracarboxylic acid or anhydride(s) with aromatic o-diamines to give bisimidazo compounds. These constitute a mixture of cis/trans isomers (possibly in the form of mixed crystals), which is separable in a more or less complicated manner into the particular components which have different spatial arrangements of atoms.

The condensation of naphthalene-1,4,5,8-tetracarboxylic acid and/or naphthalene-1,4,5,8-tetracarboxylic 1,8-monoanhydride and/or naphthalene-1,4,5,8-tetracarboxylic 1,8,4,5-dianhydride with 1,2-diaminobenzene and/or substituted 1,2-diaminobenzenes, preferably in the presence of a solvent or diluent, at elevated temperature, has been known for a long time and has been repeatedly described:

For instance, the reaction of naphthalene-1,4,5,8-tetracarboxylic acid or of an anhydride thereof with substituted or unsubstituted 1,2-diaminobenzene is carried out for example according to DE-C-430,632 by melting the two starting materials together in the absence of diluents or by heating in a high-boiling solvent such as nitrobenzene; according to FIAT Final Report 1313 II, 168, in glacial acetic acid at 120° C.; according to DE-B-1,569,736 in a low-boiling alcohol, in particular ethanol, in the presence of acetic acid at temperatures between 120° and 180° C. under superatmospheric pressure; according to DE-A-3,235,572 at preferably 130° to 170° C. in phenol or, according to Rusanov et al. in Khim. Geterotsikl. Seodin. 1979/7, 968–971, at 160° to 200° C. in m-cresol as organic diluent, and according to DE-A-1,569,740 by boiling in dilute sulfuric acid or according to SU-D-182,823 at 120° to 150° C. in dilute sulfuric acid in the presence of a surface-active dispersant. According to DE-C-1,271,861, finally, naphthalene-1,4,5,8-tetracarboxylic acid is condensed simultaneously with (a mixture of) 1,2-diaminobenzene and 4-ethoxy-1,2-diaminobenzene in an inert organic solvent such as pyridine or glacial acetic acid at the boil under atmospheric pressure or in an aqueous medium at 130° to 180° C. under superatmospheric pressure.

However, none of these existing methods of synthesizing perinone dyes and pigments are satisfactory, since either they necessitate the use of non-aqueous solvents or, if water is used as the solvent, they must be carried out using significant excesses of aromatic diamines (cf. DE-C-1,271,861, Example 3).

In some instances also the obtainable yields are not up to the standard of economics required these days of such manufacturing techniques. For instance, the yield of 94% of theory reported in Operative Example 1 of SU-D-182,823 as a result of reacting naphthalene-1,4,5,8-tetracarboxylic acid with 1,2-diaminobenzene (in dilute sulfuric acid) is incorrect, since the numerically documented amount of vat dye obtained merely amounts, on recalculation, to a yield of 83% of theory.

Moreover, the aforementioned processing techniques are partly ecologically unsafe, partly economically dubious: concern over waste disposal requires regeneration of the solvent after the condensation reaction, which also presents waste air problems; similarly, the dilute sulfuric acid must be subsequently reprocessed for renewed use; the condensation in glacial acetic acid as cosolvent leads in turn to an appreciable amount of naphthoylenebisbenzimidazole-peri-dicarboxylic anhydride

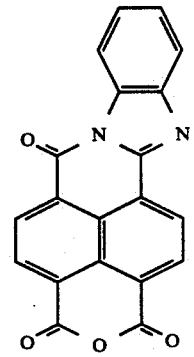

as by-product; condensation in the presence of water as diluent, as described in DE-C-1,271,861, has the disadvantage that excess aromatic diamines from the synthesis pollute the waste water.

If naphthalene-1,4,5,8-tetracarboxylic acid, naphthalene-1,4,5,8-tetracarboxylic 1,8-monoanhydride or naphthalene-1,4,5,8-tetracarboxylic 1,8,4,5-dianhydride is condensed on its own or mixed with the others with 1,2-diaminobenzene, the result is the dye C.I. Vat Red 14 (III) of C.I. No. 71110, which is an isomer mixture of the trans product C.I. Vat Orange 7 (I) of C.I. No. 71105 (which also corresponds to C.I. Pigment Orange 43) and the cis product C.I. Vat Red 15 (II) of C.I. No. 71100 (which also corresponds to C.I. Pigment Red 194);

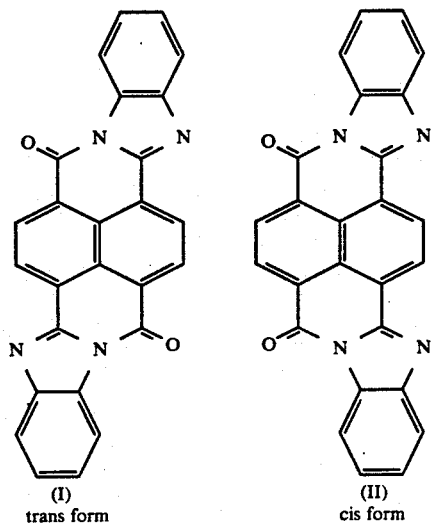

(I) trans form (II) cis form

Of these two isomeric compounds, the trans form (I) is the coloristically more desirable product on account of its interesting hue (a pure, reddish orange).

Yet there is no prior art where the preparation of the mixture III is optimized in the direction of the more interesting isomer I.

The invention to be explained hereinafter, which is concerned with the above field, thus has the following objects:

1) to eliminate the known ecological defects of conventional techniques,
2) to develop economically more advantageous methods of preparation for the colorants in question here,
3) hence to maximize the overall yield, and
4) to select or vary the conditions of the process of preparation in such a way, in particular for the condensation of naphthalene-1,4,5,8-tetracarboxylic acid (derivatives) with unsubstituted 1,2-diaminobenzene, that a maximum of the coloristically more useful trans isomer I is obtained These objects concerned with the production of vat dyes and pigments of the perinone series comprising mixtures of naphthoylenebisbenzimidazole isomers of the following molecular structures:

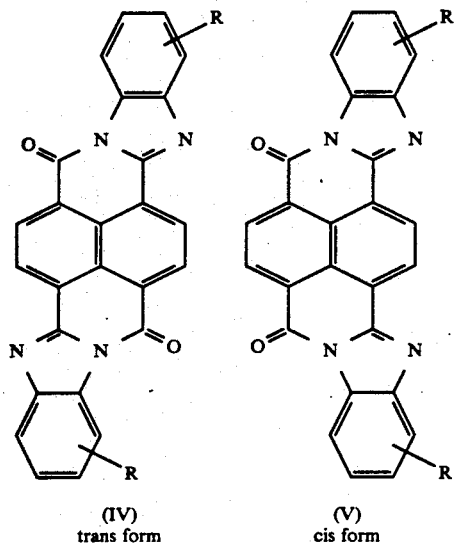

(IV)
trans form (V)
cis form where R is hydrogen, $C_1$-$C_4$-alkyl, $C_1$-$C_4$-alkoxy, chlorine, bromine, cyano, carboxyl or trifluoromethyl and where in the case of polysubstituted products each R may be identical to or different from the other one, by condensation of naphthalene-1,4,5,8-tetracarboxylic acid and/or 1,8-monoanhydride and/or 1,8,4,5-dianhydride in the presence of a solvent or diluent at elevated temperature with 1,2-diaminobenzene and/or a substituted 1,2-diaminobenzene and/or salts of these aromatic diamines which in the salt-free state conform to the following formula:

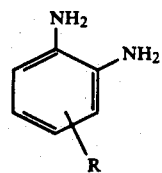

(VI)

where R is as defined above, are achieved according to the invention by initially precondensing the reactants under acid catalysis by heating in an aqueous medium under atmospheric or superatmospheric pressure within the temperature range from 60° to preferably at 80° C. to 100° C., and then completing the reaction within the temperature range from 130° to 180° preferably at 150° C. to 170° C.

Advantageously, the precondensation according to the invention is carried out over ½ an hour to 4 hours and the reaction (main condensation) is then completed in the course of 2 to 6 hours.

The acid catalysts used according to the invention are preferably biodegradable acids such as, for example, aliphatic carboxylic acids, especially acetic acid or even formic acid. The amount of acid to be used here can vary within a wide range, but should not be above 25% (based on the weight of the reaction medium) and should preferably be below 12%, in particular between 6 and 10%.

Naphthalene-1,4,5,8-tetracarboxylic acid, 1,8-monoanhydride and/or 1,8,4,5-dianhydride are preferably reacted with the aromatic diamines of the defined formulae in a stoichiometric ratio of 1:2 to 1:2.04.

It has surprisingly been found in the practice of the claimed process that the yield of the condensation is virtually quantitative without an excess of the aromatic diamine having to be used. Another unexpected finding in this context is that the reaction of naphthalene-1,4,5,8-tetracarboxylic acid (derivatives) with unsubstituted 1,2-diaminobenzene gives isomer mixture III according to the invention in the composition of 63% of trans product (I), the more desirable product, and 37% of cis product (II). If the same reactants are made to react by prior art methods, it is found, by contrast, that an isomer ratio of 57%:43% is obtained in glacial acetic acid and an isomer ratio of 59%:41% is obtained in ethanol or nitrobenzene.

The operation of the process in water, moreover, has further advantages: there are no waste air problems, organic solvents need not be regenerated afterwards, and spent dilute sulfuric acid need not be first purified and then concentrated before it can be reused.

Given these facts, the novel method for preparing compounds of the perinone series is not just ecologically but also economically the best method at present.

In the Examples which follow, parts and percentages are by weight. The level of isomers I and II was determined photometrically.

EXAMPLE 1a 144.5 parts of naphthalene-1,4,5,8-tetracarboxylic 1,8-monoanhydride of 99% purity (purified by the method described in EP-B-0,134,972), 112 parts of 1,2-diaminobenzene and 140 parts of glacial acetic acid (as acid catalyst) are stirred in 1800 parts of water (as solvent) in an autoclave at room temperature for 1 hour, during which the air present in the treatment vessel is displaced by nitrogen. The contents are then heated to 60° C. and thereafter slowly over 4 hours at a uniform rate from 60° to 110° C. During the precondensation which occurs within this temperature range, intensive stirring of the highly viscous reaction mixture is continued. Thereafter the treatment temperature is rapidly raised to 150°-160° C. and stirring is continued under such conditions for a further 6 hours during which the reaction mixture becomes liquid again and the reaction ends. Thereafter the liquid autoclave contents are allowed to cool down, and the precipitated condensation product is filtered off with suction, washed with hot water and dried at 100° C.

Yield: 202.6 parts (98% of theory) of the dye C.I. Vat Red 14 of C.I. No. 71110 (III).

The product thus obtained is an isomer mixture (III) an is composed of
- 63% of the dye C.I. Vat Orange 7 of C.I. No. 71105/trans isomer (I) and
- 37% of the dye C.I. Vat Red 15 of C.I. No. 71100/cis isomer (II).

If the reactants mentioned are condensed in non-aqueous, organic solvents, the isomer mixtures obtained have the following compositions:

| Solvent | Structure I | Structure II |
| --- | --- | --- |
| Glacial acetic acid | 57% | 43% |
| Ethanol | 59% | 41% |
| Nitrobenzene | 59% | 41% |

EXAMPLE 1b

If the reaction is carried out as described in Example 1a, except that the precondensation at 60°-110° C., which was carried out in Example 1a, is dispensed with and instead the starting materials, after they have been mixed, are directly and rapidly heated to 160° C., the result of the modified condensation conditions is that, although the dye C.I. Vat Red 14 (C.I. No. 71110) is likewise obtained, it is obtained in a form which when pure comprises an isomer mixture of only 59% of the dye C.I. Vat Orange 7 (C.I. No. 71105) and 41% of the dye C.I. Red 15 (C.I. No. 71100) and which is contaminated to a considerable extent with naphthoyleneben-zimidazole-peri-dicarboxylic anhydride as by-product.

EXAMPLE 2

71.5 parts of naphthalene-1,4,5,8-tetracarboxylic 1,8-monoanhydride, 76 parts of 4-ethoxy-1,2-diaminobenzene and 70 parts of glacial acetic acid are stirred in 800 parts of water in an autoclave under nitrogen. The batch is then initially heated to from 90°-100° C. for 4 hours and then at 160° C. for 6 hours. After the condensation has ended, the reaction mixture is cooled down, and the precipitated reaction product is filtered off with suction, washed with hot water until neutral and dried.

The yield obtained is 124.2 parts (99% of theory) of the dye C.I. Vat Brown 14 of C.I. No. 71120 (as isomer mixture).

EXAMPLE 3

87.6 parts of 4-ethoxy-1,2-diaminobenzene, stabilized as sulfuric acid salt and in the moist state, containing 29.5% of 4-ethoxy-1,2-diaminobenzene as pure base, are introduced into 620 parts of water and brought to pH 6.8 by the addition of about 40 parts of 30% strength sodium hydroxide solution. This batch is then admixed in succession with 180 parts of water and 35.7 parts of 1,2-diaminobenzene and then brought to pH 4.2 by means of about 70 parts of glacial acetic acid. This mixture of two different diamines then has added to it 71.5 parts of naphthalene-1,4,5,8-tetracarboxylic 1,8-monoanhydride while the mixture is vigorously stirred at room temperature, and afterwards it is initially heated to 90°-100° C. for 4 hours to initiate the condensation. The reaction is then completed by further heating at 160° C. for 6 hours under superatmospheric pressure. The contents are then cooled down, and the condensation product formed is filtered off, washed until neutral and dried.

Yield: 109 parts (98% of theory) of a reddish brown vat dye.

EXAMPLE 4

71.5 parts of naphthalene-1,4,5,8-tetracarboxylic 1,8-monoanhydride, 61.6 parts of 4-methyl-1,2-diaminobenzene and 70 parts of glacial acetic acid are stirred in 900 parts of water in an autoclave under nitrogen. The reactant mixture is then heated initially at 90°-100° C. for 4 hours and then at 160° C. for a further 6 hours. The batch is then cooled down, and the reaction product is filtered off with suction, washed with hot water until neutral and dried.

109 parts (99% of theory) of a red vat dye are obtained.

We claim:

1. A process for preparing vat dyes and pigments of the perinone series comprising mixtures of naphthoylenebis benzimidazole isomers of the molecular structures:

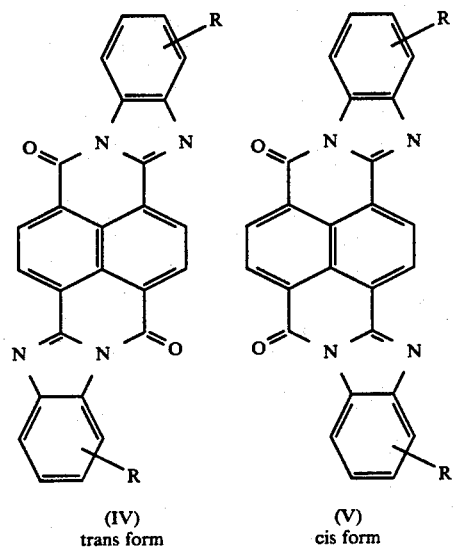

(IV) trans form    (V) cis form where R is hydrogen, $C_1$-$C_4$-alkyl, $C_1$-$C_4$-alkoxy, chlorine, bromine, cyano, carboxyl or trifluoromethyl and the groups R are equal or different from each other, by condensation of at least one acid component selected from the group consisting of naphthalene-1,4,5,8-tetracarboxylic acid, its 1,8-monoanhydride, its 1,8,4,5-dianhydride and a mixture thereof at elevated temperature with at least one diamino component selected from the group consisting of at least one diamine of the formula

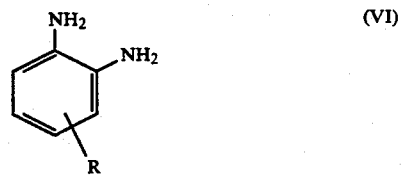

(VI)

where R is as defined above, at least one salt of said diamines, and a mixture of at least one diamine and at least one salt of said diamine which comprises initially precondensing the said acid component with the said diamino component under acid catalysis by heating in an aqueous medium within a temperature range from 60° to 110° C., thereby obtaining a partially completed condensation of said acid component and said diamino component, and then completing the condensation within a temperature range from 130° C. to 180° C.

2. The process as claimed in claim 1, wherein initially the reactants are precondensed within the temperature range from 80° to 100° C. and the condensative is then completed within the temperature range from 150° to 170° C.

3. The process as claimed in claim 1, wherein said diamine is 4-ethoxy-1,2-diaminobenzene.

4. The process as claimed in claim 1, wherein the precondensing step is carried out over ½ an hour to 4 hours and the subsequent completion of the condensation is then completed in a further 2 to 6 hours.

5. The process as claimed in claim 1, wherein the acid catalysis is effected by a biodegradable acid.

6. The process as claimed in claim 5, wherein the acid catalysis is effected by an aliphatic carboxylic acid.

7. The process as claimed in claim 6, wherein the carboxylic acid is acetic acid.

8. The process as claimed in claim 1, wherein naphthalene-1,4,5,8-tetracarboxylic acid, its 1,8-monoanhydride, its 1,8,4,5-dianhydride or a mixture thereof is reacted with the diamino component in a molar ratio of 1:2 to 1:2.04.

9. The process as claimed in claim 5, wherein the acid catalyst is present in an amount of at most 25% based on the weight of the reaction medium.

10. The process as claimed in claim 9, wherein the amount is below 12%.

11. The process as claimed in claim 10, wherein the amount is between 6 and 10%.

* * * * *